United States Patent [19]
Newman

[11] Patent Number: 5,948,976
[45] Date of Patent: Sep. 7, 1999

[54] METHOD FOR ANALYZING A SEPARATION IN A DEFORMABLE STRUCTURE

[75] Inventor: John W. Newman, Newtown, Pa.

[73] Assignee: Michelin North America, Inc., Greenville, S.C.

[21] Appl. No.: 09/088,906

[22] Filed: Jun. 2, 1998

Related U.S. Application Data

[60] Division of application No. 08/785,095, Jan. 21, 1997, Pat. No. 5,786,533, which is a continuation-in-part of application No. 08/633,669, Apr. 17, 1996, abandoned.

[51] Int. Cl.[6] ............................................. G01M 17/00
[52] U.S. Cl. ............................................................ 73/146
[58] Field of Search ............................... 73/13, 37, 146, 73/760, 826, 837

[56] References Cited

U.S. PATENT DOCUMENTS

| | | | |
|---|---|---|---|
| 4,139,302 | 2/1979 | Hung et al. | 356/32 |
| 4,225,237 | 9/1980 | Rottenkolber | 356/348 |
| 4,225,238 | 9/1980 | Rottenkolber | 356/348 |
| 4,234,256 | 11/1980 | Yeager . | |
| 4,257,264 | 3/1981 | Rottenkolber | 73/146 |
| 4,506,981 | 3/1985 | Hoff, Jr. | 356/347 |
| 4,682,892 | 7/1987 | Chawla | 356/353 |
| 4,702,594 | 10/1987 | Grant | 356/35.5 |
| 4,887,899 | 12/1989 | Hung | 356/35.5 |
| 4,934,184 | 6/1990 | Tsuji . | |
| 5,007,738 | 4/1991 | Grant . | |
| 5,094,528 | 3/1992 | Tyson, II et al. | 356/35.5 |
| 5,113,079 | 5/1992 | Matulka | 250/550 |
| 5,194,918 | 3/1993 | Kino et al. | 356/359 |
| 5,307,139 | 4/1994 | Tyson, II et al. | 356/35.5 |
| 5,339,152 | 8/1994 | Horn | 356/347 |
| 5,481,356 | 1/1996 | Pouet et al. | 356/35.5 |

FOREIGN PATENT DOCUMENTS 406034335 2/1994 Japan .

*Primary Examiner*—Robert Raevis
*Attorney, Agent, or Firm*—Jenkens & Gilchrist, P.C.

[57] ABSTRACT

A deformable structure is subjected to a plurality of reduced pressures, causing a bulge in the surface of the deformable structure above a separation in the deformable structure. The cross sectional area of the bulge is measured for each reduced pressure in a plane parallel to the surface of the deformable structure. When the cross sectional area of the bulge does not increase with a reduction in the pressure, the cross sectional area of the bulge approximates the area of the separation. The depth of the separation is calculated using the change in cross sectional area of the bulge per change in pressure.

6 Claims, 3 Drawing Sheets

METHOD FOR ANALYZING A SEPARATION IN A DEFORMABLE STRUCTURE

This application is a divisional of prior application Ser. No. 08/785,095 filed on Jan. 21, 1997, now U.S. Pat. No. 5,786,533, which is a Continuation-in-Part of application Ser. No. 08/633,669 filed on Apr. 17, 1996, now abandoned.

BACKGROUND

The present invention relates to nondestructive testing, and more particularly, nondestructive testing for analyzing a separation in the material of a deformable structure.

Separations can occur in the material of a deformable structure that can reduce the strength of the structure. Often, visual inspection alone cannot determine the existence of the separation in the deformable structure. Therefore, there is a need for methods that can determine if a separation has occurred in the material of a deformable structure.

In determining whether the deformable structure with a separation can be used, or whether a separation in the deformable structure can be repaired, it is necessary to know information about the separation such as the size and location of the separation. Therefore, there is a need for methods that can determine information on the size and location of separations within the material of a deformable structure.

For example, tires can develop separations within the body of the tire during use. Whether or not the tire can be retreaded for additional use depends on the size and location of such separation in the tire. Therefore, there is a need for methods that determine size and location of separations in the material of a tire.

SUMMARY

In one embodiment, the present invention is a method for determining the location of a separation in the material of a deformable structure comprising the steps of: subjecting a deformable structure to a plurality of predetermined deformed conditions, thereby forming a bulge in a surface of the deformable structure at each predetermined condition due to the separation in the deformable structure; measuring the cross-section in a predetermined plane of the bulge formed in the surface of the deformable structure at each predetermined deformed condition; determining the location of the separation in the material of the deformable structure from the cross-section of the bulge in a plane parallel to the surface, at each predetermined deformed condition.

In another embodiment, the present invention is a method for determining the location of a separation in the material of a deformable structure comprising the steps of: subjecting the test deformable structure to a plurality of test pressures, thereby causing a bulge in a surface of the test deformable structure at each test pressure due to the separation in the test deformable structure; measuring the cross sectional area in a predetermined plane of the bulge formed in the surface of the test deformable structure at each test pressure; subjecting a reference deformable structure having at least one reference separation of known size and depth to a plurality of reference pressures, thereby causing a reference bulge in a surface of the reference deformable structure at each of the reference pressures due to the reference separation; measuring the cross sectional area in a predetermined plane of the reference bulge formed in the surface of the reference deformable structure at each reference pressure; and comparing the cross sectional area of the bulge formed in the surface of the test deformable structure at each of the test pressures with the cross sectional area of the reference bulge formed in the surface of the reference deformable structure at each of the test pressures to determine the location of the separation in the test deformable structure.

In another embodiment, the present invention is a method for determining the location of a separation in the material of a deformable structure comprising the steps of: subjecting the test deformable structure to a predetermined pressure, thereby causing a bulge in a surface of the test deformable structure due to the separation in the material of the test deformable structure; measuring the cross sectional area in a predetermined plane, parallel to the surface, of the bulge formed in the surface of the test deformable structure at the predetermined pressure; determining the size of the separation in the test deformable structure; providing a reference deformable structure having at least one reference separation in the material of the reference deformable structure the same size as the separation in the material of the test deformable structure and at a predetermined depth; subjecting the reference deformable structure to the predetermined pressure, thereby causing a reference bulge in a surface of the test deformable structure due to the reference separation in the material of the test deformable structure; measuring the cross sectional area in a predetermined plane of the reference bulge formed in the surface of the reference deformable structure at the predetermined pressure; and comparing the cross sectional area of the bulge formed in the surface of the test deformable structure at the predetermined pressure with the cross sectional area of the reference bulge formed in the surface of the reference deformable structure at the predetermined pressure to determine the depth of the separation in the test deformable structure.

In another embodiment, the present invention is a method for determining the location of a separation in the material of a deformable structure comprising the steps structure and thereby forming a bulge in a surface of the test deformable structure due to the separation in the material of the test deformable structure, until the bulge crosses a predetermined plane; determining the size of the separation in the test deformable structure; providing a reference deformable structure having at least one reference separation in the material of the reference deformable structure the same size as the separation in the material of the test deformable structure and at a predetermined depth; reducing the pressure in the vicinity of the reference separation in the reference deformable structure and thereby forming a reference bulge in a surface of the reference deformable structure due to the separation in the material of the reference deformable structure, until the reference bulge crosses a predetermined plane; and comparing the pressure at which the bulge formed in the surface of the test deformable structure crossed the predetermined plane with the pressure at which the reference bulge formed in the surface of the reference deformable structure crossed the predetermined plane to determine the depth of the separation in the test deformable structure.

BRIEF DESCRIPTION OF THE DRAWINGS

These and other features, aspects, and advantages of the present invention will become better understood with regard to the following detailed description, appended claims, and appended drawings, where:

DETAILED DESCRIPTION

Figure 1:
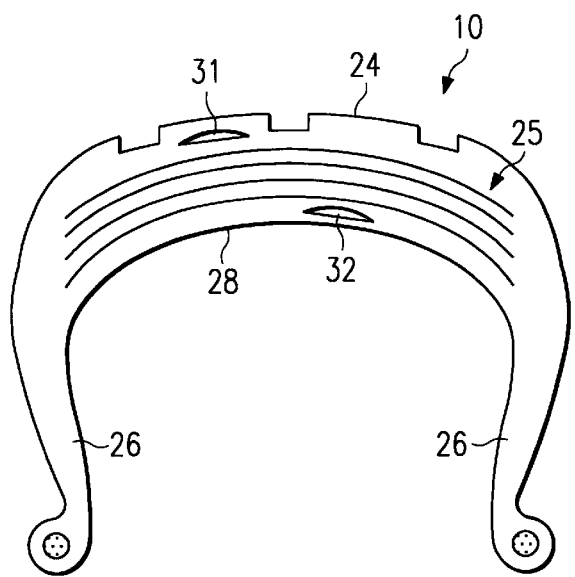
FIG. 1 is a cross sectional view of a deformable structure in the form of a tire, illustrating separations of the material therein.

Referring now to the figures, and in particular to FIG. 1, there is shown a deformable structure in the form of a tire 10. The tire 10 generally comprises sidewalls 26 connected by belts 25, and a crown or tire tread 24 on top of the belts 25. A first separation 31 exists in the material of the tire 10 above the belts 25. A second separation 32 exists in the material of the tire 10 below the belts 25.

Figure 2:
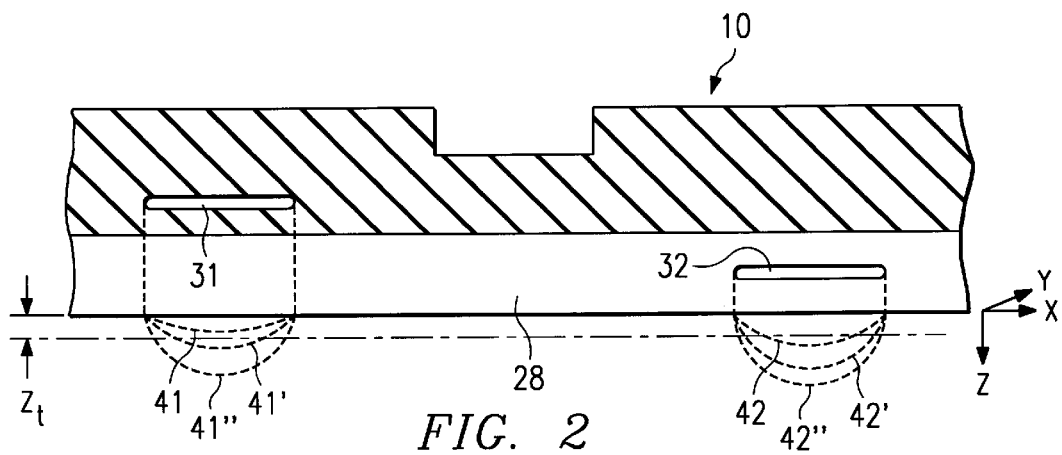
FIG. 2 is a partial cross-sectional view of the tire from FIG. 1, illustrating the separations of the material in the tire at different deformation conditions.
Figure 3:
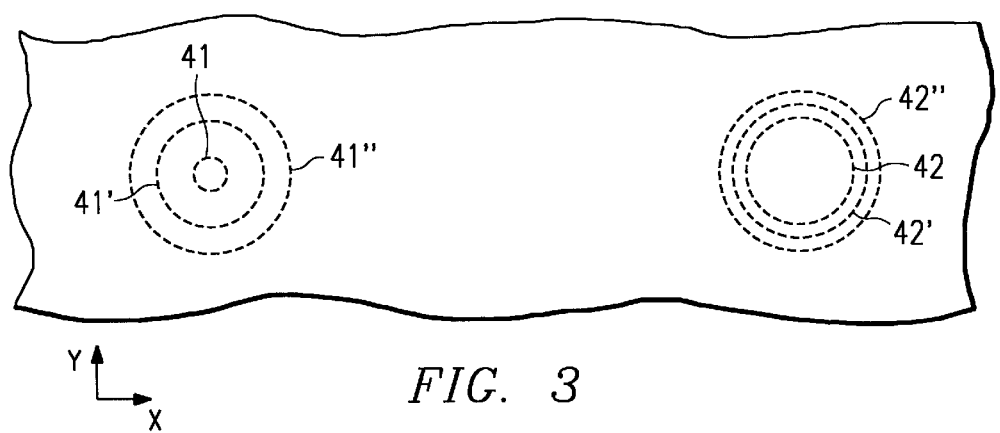
FIG. 3 is a cross sectional view of the time from FIG. 1 in a plane $z_t$, illustrating the separation of the material in the tire at different deformation conditions.

When a deformed condition is created in the vicinity of the separations 31 and 32 within the tire 10, bulges 41 and 42 occur in the inner surface 28 of the tire 10 due to the separations 31 and 32, respectively, as shown in FIGS. 2 and 3. The bulges 41 and 42 are the flexing of material in the tire 10 in the direction z directly over the separations 31 and 32, respectively, due to the reduced pressure. When the bulges 41 and 42 are viewed in a cross-sectional plane that is perpendicular to the surface 28, the bulges 41 and 42 appear as a dome shape in the inner surface 28 of the tire 10, as shown in FIG. 2. When the bulges 41 and 42 are viewed in a cross-sectional plane that is parallel to the surface 28 and is offset in the z direction from surface 28 a distance $z_t$, the bulges 41 and 42 appear as a generally circular area, as shown in FIG. 3.

One method of creating a deformed condition in a deformable structure to analyze separations is to reduce the pressure in the vicinity of the separations. For purposes of illustration, this specification will refer to the reduction of pressure for the creation of a deformed condition in the deformable structure.

When the pressure against the inner surface 28 of the tire 10 is reduced to a pressure P in the vicinity of the separations 31 and 32, the bulges 41 and 42 occur in the inner surface 28 due to the separations 31 and 32, respectively. In the tire 10, the inner surface provides a convenient surface for measuring the cross sectional area of bulges; however, other surfaces can also be observed to determine the cross sectional area of bulges. As the pressure against the tire inner surface 28 in the area of the separations 31 and 32 is further reduced to a pressure P' and a lower pressure P", the bulges 41 and 42 increase their height in the z direction to a height 41' and 42' and a height 41" and 42", respectively. Initially, the area of the bulges 41 and 42 in the plane $z_t$ will also increase as the pressure against the inner surface 28 of the tire 28 is reduced in the area of the separations 31 and 32. The area of the bulges 41 and 42 in the plane $z_t$ will continue to increase in size with an increase in the height of the bulges 41 and 42 in the z direction until the area of the bulges 41 and 42 in the plane $z_t$ reach a maximum area in the plane $z_t$. Once the area of the bulges 41 and 42 reach the their maximum area in the plane $z_p$ then the area of the bulges 41 and 42 in the plane $z_t$ will cease to continue to grow with a continued reduction of pressure or a continued growth of the bulges 41 and 42 in the z direction.

A discovery of the present invention is that the depth of a separation within a deformable body is related to the change in the area of the bulge in the plane $z_t$ per reduction of pressure against the exterior surface of the deformable body adjacent to the separation, and that the area of a bulge in the plane $z_t$ will cease to increase with decreasing pressure against the exterior surface of the deformable body adjacent to the separation once the area of the bulge in the plane $z_t$ is approximately the same area as the separation. In general, the greater the depth that a separation exists in the deformable structure, the greater the amount of pressure drop on the surface adjacent to the separation that must be experienced to cause a particular change in the area of the bulge in a plane parallel to the surface. Conversely, the closer the separation is to the surface of the deformable material, the lesser the pressure drop on the surface adjacent to the separation will be that is required to cause a particular change in the area of the bulge in the plane parallel to the surface. Also, the area of a bulge in a plane parallel to the surface will cease increasing with a decrease in pressure on the surface once the area of the bulge in the plane parallel to the surface is approximately the same as the area of the separation.

The change in the area of a bulge in the plane parallel to the surface per reduction of the pressure on the surface adjacent to the separation is related to the depth of the separation, the modulus of the elasticity of the material being tested, and the area of the separation. For separations of the same area, and assuming homogeneity of the material, the depth of a separation is inversely proportional to the change in area of a bulge in a parallel plane per reduction in pressure. In general terms, when the area or diameter of the bulge in a parallel plane increases greatly with a predetermined increment of pressure change, the separation is close to the surface of the object, and when the area or diameter of the bulge in the parallel increases more slightly with the same predetermined increment of pressure change, the separation is located more deeply inside the object. Also, the area or diameter of the bulge in a parallel plane will reach the maximum diameter or area at a lower pressure for separations that are closer to the surface.

As an example, the separations 31 and 32 have the same area, but separation 31 is located at a deeper depth from the inner surface 28 than separation 32. The area of the bulges 41 and 42 in the plane $z_t$ are plotted in FIG. 4 in relation to the pressure against the inner surface 28 in the area of the separations 31 and 32. The area $A_{1-6}$ of the bulge 41 in the plane $z_t$ is plotted at pressure readings $P_{1-6}$ the curve 51. Likewise, the area $B_{1-6}$ of the bulge 42 in the plane $z_t$ is plotted in relationship to $P_{1-6}$ as the curve 52. Separations 31 and 32 have the same area; and therefore the maximum cross-sectional area that the bulges 41 and 42 reach is approximately the same. However, the curve 52 for the bulge 42 reaches the maximum cross-sectional area in the plane $z_t$ at a lower pressure than the curve 51 for the bulge 41. Also, the cross-sectional area 51 of the bulge 41 in the plane $z_t$ begins at a greater pressure drop than the cross-sectional area 52 for the bulge 42, and requires a greater change in the pressure drop than the bulge 42 to reach the maximum area cross-sectional area.

Figure 4:
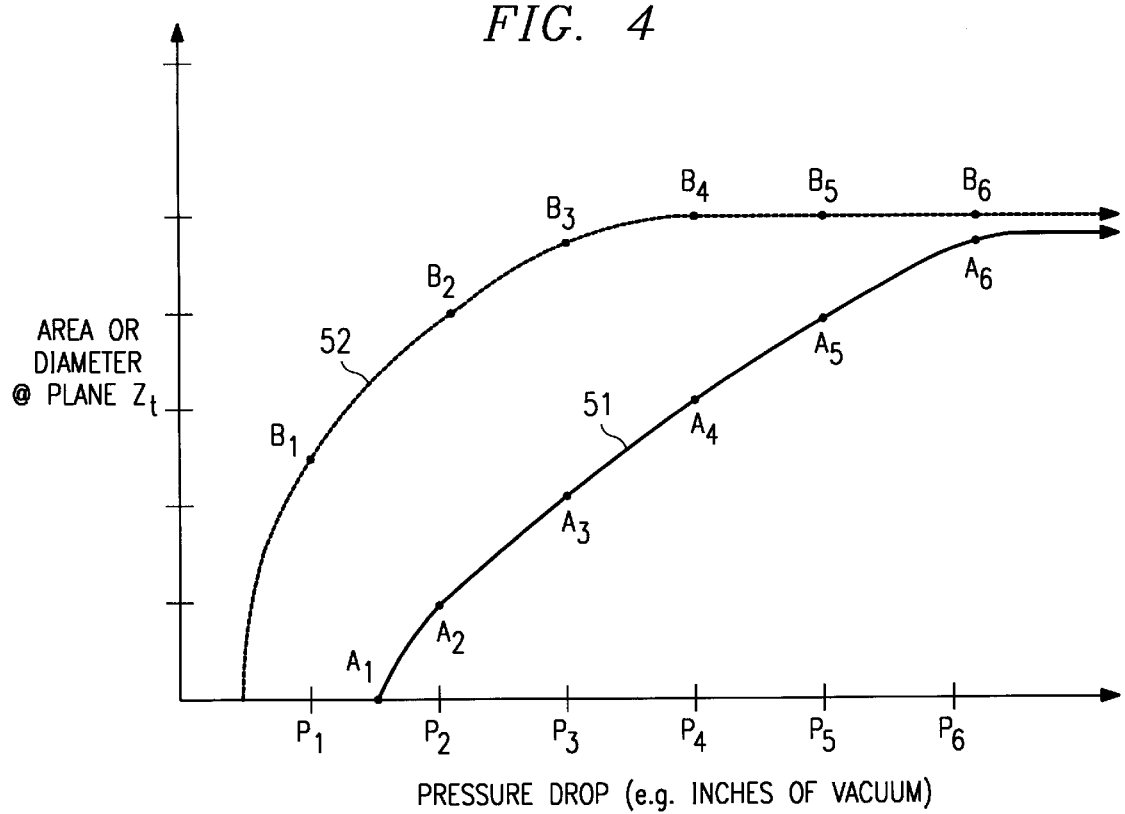
FIG. 4 is a chart illustrating the growth of the cross-sectional area of the bulges in the material of the tire in FIG. 1, in relation to the decrease in pressure surrounding the separations.

It can be seen from FIG. 4 that a predetermined curve representing a bulge cross sectional area at various pressures can be obtained for specific known separation sizes and depths in a reference deformable structure having a particular modulus of elasticity. By comparing the cross sectional area of a bulge in the reference deformable structure with the cross sectional area of a bulge in a test deformable structure at the same pressure and having the same separation size and modulus of elasticity, it can be determined whether or not the separation in the test deformable structure is at the same depth as the separation in the reference deformable structure. If predetermined curves are obtained from reference deformable structures having different separation sizes and depths, then the curves derived from a test deformable structure having the same modulus of elasticity can be compared with the predetermined curves from the reference deformable structures to determine the size and depth of separations in the test deformable structure.

In one method, the inner surface 28 of the tire 10 in the vicinity of the separations 31 and 32 is subjected to a plurality of pressures and the cross sectional area of the bulges 41 and 42 is plotted against the corresponding pressure. The curve created by plotting the cross sectional areas of the bulges 41 and 42 against pressure is compared to curves generated by plotting the cross sectional areas of bulges in test tires having the same modulus of elasticity and various separation sizes and depths, that are subjected to corresponding pressures. When a curve from the test tire 10 matches a particular curve from one of the reference tires, then the depth and size of the separation in the test tire 10 corresponds to the size and depth of the separation in the reference tire that generated the matching curve.

It can also be seen from FIG. 4 that for a particular separation size, the cross sectional area of the bulge at a predetermined pressure will vary with the depth of the separation. If the cross sectional area of bulges in reference deformable structures having the same size separation, but at different depths, are determined at a specific pressure, then the cross sectional area of a bulge in a test deformable structure having the same modulus of elasticity and the same size separation can be compared with the cross sectional areas of the bulges in the reference deformable structures to determine the depth of the separation in the test deformable structure.

In one method, the area of the inner surface 28 of the tire 10 in the vicinity of the separations 31 and 32 is subjected to a predetermined pressure, and the cross sectional area of the bulges 41 and 42 is measured. The areas of the separations 31 and 32 in the test tire 10 can be found by inspection methods such as x-ray or by reducing the pressure against the inner surface 23 in the vicinity of the separations 31 and 32 until the cross sectional area of the bulges 41 and 42 reaches a maximum. The areas of the separations 31 and 32 are approximated by the maximum achieved area of the bulges 41 and 42 in the plane $z_t$ when the plane $z_t$ is relatively close to the separations 31 and 32. The cross sectional areas of the bulges 41 and 42 from the test tire 10 are compared with the cross sectional areas of the bulges from reference tires subjected to the same predetermined pressure and having the same modulus of elasticity and separation areas, but at various depths. When a cross sectional area of a bulge from the test tire 10 matches a particular cross sectional area of a bulge from one of the reference tires, then the depth of the separation in the test tire 10 corresponds to the depth of the separation in the reference tire that generated the matching bulge area.

It can further be seen from FIG. 4 that the pressure at which a bulge crosses the plane $z_t$ is related to the size and depth of the separation in the deformable structure. Reference deformable structures having various separation sizes at the same predetermined depth can be subjected to pressure changes to determine at what pressure the bulge crosses the plane $z_t$. The pressure at which a bulge in a test deformable structure crosses the plane $z_t$ can be compared with the pressure at which a bulge in the reference deformable structure, having the same size separation and modulus of elasticity, crosses the plane $z_t$ to determine if the separation in the test deformable structure is above or below the depth of the separation in the reference deformable structure.

In one method, the pressure in the area of the inner surface 28 of the tire 10 is reduced in the vicinity of the separations 31 and 32 until the bulges 41 and 42 cross the plane $z_t$. The areas of the separations 31 and 32 in the test tire 10 can be found by inspection methods such as x-ray or by reducing the pressure against the inner surface 23 in the vicinity of the separations 31 and 32 until the cross sectional area of the bulges 41 and 42 reaches a maximum. The areas of the separations 31 and 32 are approximated by the maximum achieved area of the bulges 41 and 42 in the plane $z_t$ when the plane $z_t$ is relatively close to the separations 31 and 32. The pressure at which the bulges 41 and 42 cross the plane $z_t$ can be compared with the pressures at which bulges in reference tires having the same modulus of elasticity and separation size cross the plane $z_t$ to determine if the separations 31 and 32 in the test tire 10 are above or below the same depth as the separations in the reference tire.

Figure 5:
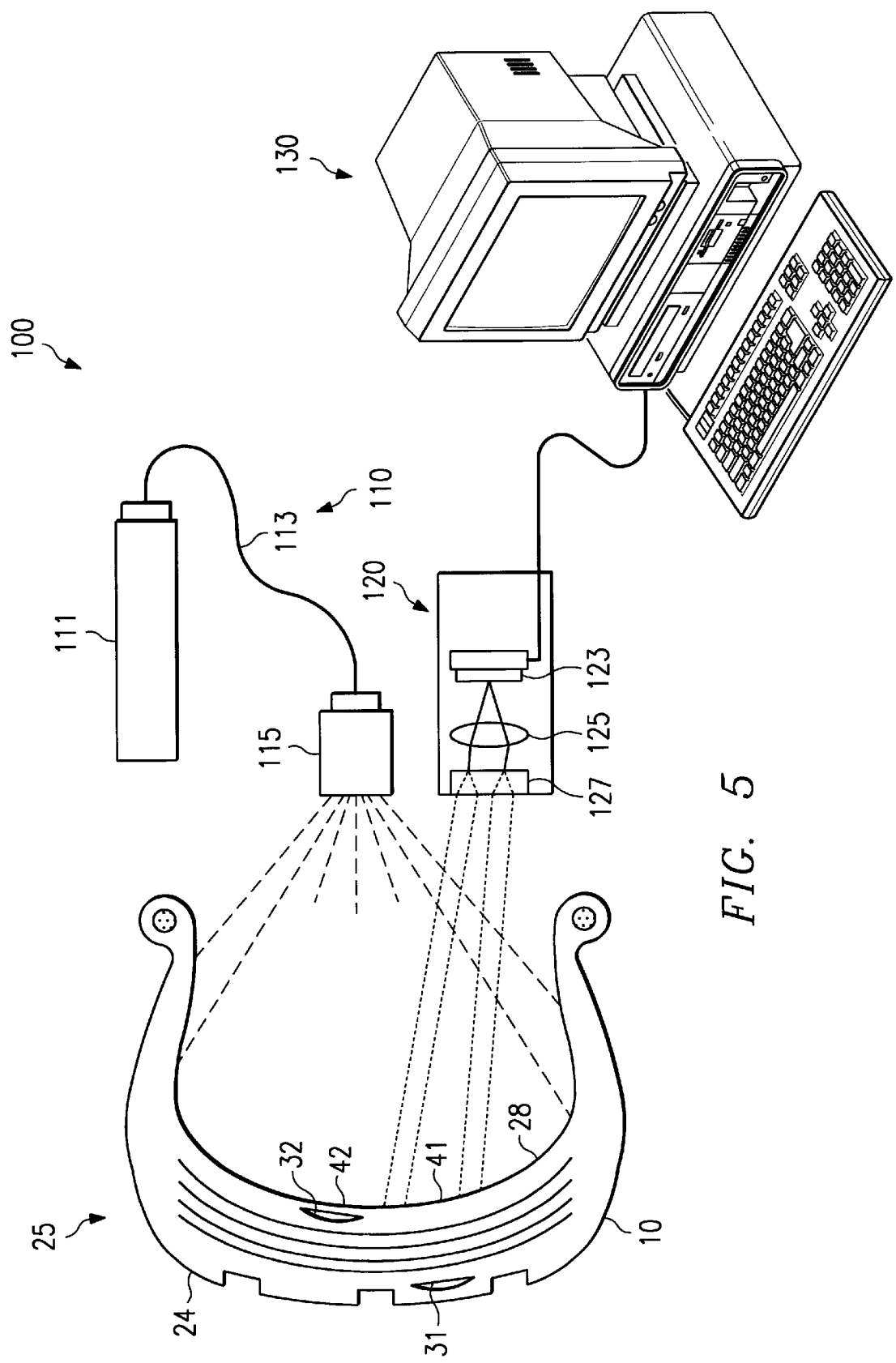
FIG. 5 is a block diagram illustrating an embodiment of an apparatus of the present invention for detecting the separations in the tire illustrated in FIG. 1.

One apparatus for determining the area of a bulge in the threshold plane $z_t$ is the shearography device 100 as shown in FIG. 5. The shearography device 100 includes a laser illuminator 110, a shearography camera 120, and an image processor 130. The illuminator 110 includes a laser 111 that provides coherent light through a fiber optic cable 113 into a fiber optic illuminator 115. The coherent laser light from the laser 111 is projected by the fiber optic illuminator 115 onto the inside surface 28 of the tire 10. The shearography camera 120 includes an image shearing device 127, a lens 125, and a video camera 123.

The coherent light that the illuminator 110 projects onto the inside surface 28 of the tire 10 is received by the image shearing device 127 and the lens 125 of the shearography camera 120. The image shearing device 127 shears the image received by the shearography camera 120 and passes that dual image through the lens 125 to create an interferogram. The interferogram creates a dual image of the coherent light at a location $z_t$ above the inside surface 28 of the tire 10. The interferogram is received by the video camera 123 and converted into a video image for processing.

Figure 6:
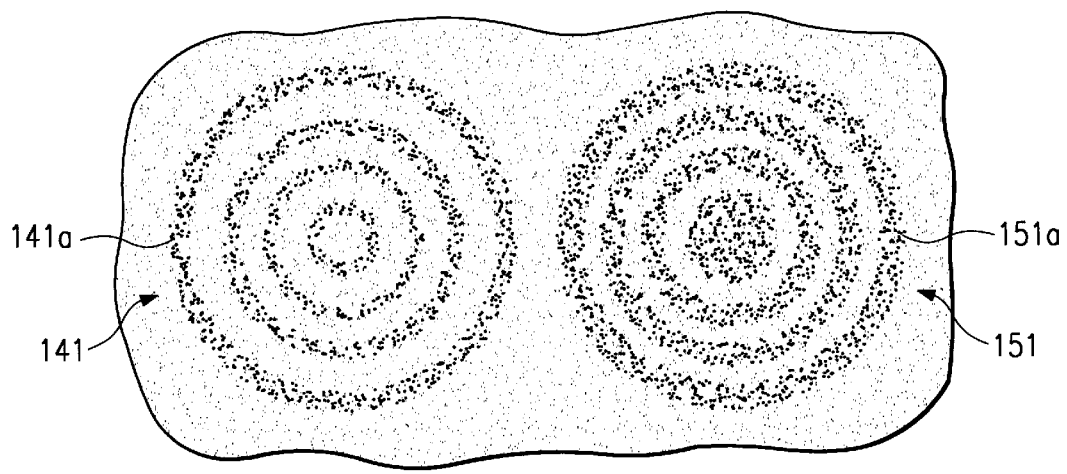
FIG. 6 is a diagram illustrating an interferogram image generated by the apparatus in FIG. 5.

A representation of an interferogram showing the cross-sectional view in a plane $z_t$ above the inside surface 28 of the tire 10 for the bulge 41 is shown in FIG. 6. Although FIG. 6 illustrates the interferogram for bulge 41, bulge 42 and other bulges in the inner surface 28 of the tire 10 will have a similar interferogram. Due to the splitting of images by the image shearing device 127 for interference purposes, the bulge 41 will be displayed in an interferogram as two groups of concentric rings 141 and 151. The cross-sectional area of the bulge 41 in the plane $z_t$ for a particular pressure can be determined by measuring the area within the outermost concentric ring 141a or 151a for either group of concentric rings 141 or 151.

By comparing the area of the bulge 41 in the interferograms at different pressures, the change in the area of the bulge 41 per change in pressure can be calculated. Also, the maximum area of the bulge 41 in the plane $z_t$ can be determined by comparing the area of the bulge 41 in each interferogram. Using change of area of the bulge 41 in the plane $z_t$ per change in pressure, the maximum area of the bulge 41 in the plane $z_t$ and the principles of the present invention, the depth of the separation 31 in the tire 10 can be determined. The same process is used to determine the area and depth of the separation 32, or any other separation in the tire 10.

Note that, the shearography camera 120 is positioned to view the inside surface 28 of the tire 10. Thus, a separation found to be shallow, relative to the camera 120, is a separation that is deep relative to the tire tread 24, while a separation found to be deep, relative to the camera 120, is more likely to be shallow relative to the tire tread 24. Thus, with the camera 120 positioned to view the inner surface 28 of the tire 10, a shallow separation is less likely to be repairable and a deep separation is more likely to be repairable.

The processor or computer 130 can also be programmed to store each interferogram in its memory and automatically analyze each interferogram to determine the area and depth of the separations 31 and 32. The processor 130 analyzes each interferogram to determine the location of each separation 31 and 32 and the area of the bulges 41 and 42 in the plane $z_t$. The processor 130 uses the area of the bulges 31 and 32 form the interferograms to determine the area for each separation 31 and 32 and the change in the area of the bulges 41 and 42 in the plane $z_t$ per reduction in the pressure. Then, the processor 130 can use the area for each separation 31 and 32 and the change in the area of the bulges 41 and 42 in the plane $z_t$ per reduction in the pressure, with the present invention to calculate the depth of the separation 31 and 32. By using an automated electronic means of analysis, one need not depend on the skill or judgment of an operator, as all results are obtained directly from the stored interferograms.

Although the present invention has been described in considerable detail with reference to certain preferred embodiments thereof, it will be understood that the invention is not limited to the embodiment disclosed, but is capable of numerous arrangement, modifications, and substitutions without departing from the spirit of the invention as set forth and defined by the following claims. As an example, separations in deformable structures other than tires can be evaluated by the present invention. Also, the forces inducing deformation in the deformable structure, such as pressure changes, can progress from greater deformation to lesser deformation or from lesser deformation to greater deformation. Therefore, the spirit and scope of the appended claims should not be limited to the description of the preferred embodiments contained herein.

What is claimed is:

1. Method for determining the depth of a separation in the material of a test deformable structure comprising the steps of:

subjecting the test deformable structure to a plurality of test pressures, thereby causing a test bulge in a test surface of the test deformable structure at each test pressure due to the separation in the test deformable structure;

measuring the cross sectional area in a predetermined test plane of the test bulge formed in the test surface of the test deformable structure at each test pressure;

subjecting a reference deformable structure having at least one reference separation of known size and depth to a plurality of reference pressures, thereby causing a reference bulge in a reference surface of the reference deformable structure at each of the reference pressures due to the reference separation;

measuring the cross sectional area in a predetermined reference plane of the reference bulge formed in the reference surface of the reference deformable structure at each reference pressure; and comparing the cross sectional area of the test bulge formed in the surface of the test deformable structure at each of the test pressures with the cross sectional area of the reference bulge formed in the surface of the reference deformable structure at each of the test pressures to determine the location of the separation in the test deformable structure.

2. The method according to claim 1, wherein said step of measuring the cross sectional area of the test bulge in the test deformable structure includes the predetermined test plane being substantially parallel to the test surface of the test deformable structure, and wherein said step of measuring the cross sectional area of the reference bulge in the reference deformable structure includes the predetermined reference plane being substantially parallel to the reference surface of the reference deformable structure.

3. The method according to claim 2, wherein the distance between the predetermined test plane and the test surface is substantially the same distance as the distance between the predetermined reference plane and the reference surface.

4. Method for determining the depth of a separation in the material of a test deformable structure comprising the steps of:

subjecting the test deformable structure to a plurality of test pressures, thereby causing a test bulge in a test surface of the test deformable structure at each test pressure due to the separation in the test deformable structure;

measuring the diameter in a predetermined test plane of the test bulge formed in the test surface of the test deformable structure at each test pressure;

subjecting a reference deformable structure having at least one reference separation of known size and depth to a plurality of reference pressures, thereby causing a reference bulge in a reference surface of the reference deformable structure at each of the reference pressures due to the reference separation;

measuring the diameter in a predetermined reference plane of the reference bulge formed in the reference surface of the reference deformable structure at each reference pressure; and comparing the diameter of the test bulge formed in the surface of the test deformable structure at each of the test pressures with the diameter of the reference bulge formed in the surface of the reference deformable structure at each of the test pressures to determine the location of the separation in the test deformable structure.

5. The method according to claim 4, wherein said step of measuring the diameter of the test bulge in the test deformable structure includes the predetermined test plane being substantially parallel to the test surface of the test deformable structure, and wherein said step of measuring the diameter of the reference bulge in the reference deformable structure includes the predetermined reference plane being substantially parallel to the reference surface of the reference deformable structure.

6. The method according to claim 5, wherein the distance between the predetermined test plane and the test surface is substantially the same distance as the distance between the predetermined reference plane and the reference surface.

* * * * *